Figure 1:
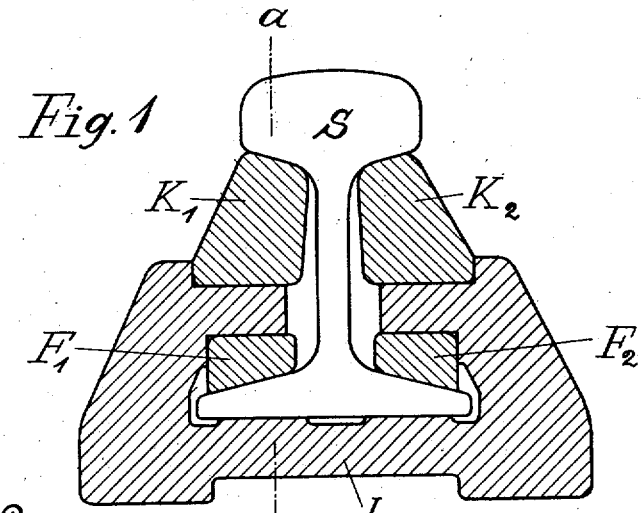

F. HOCH.

RAIL JOINT.

APPLICATION FILED MAY 29, 1913.

Reissued Sept. 16, 1913. 13,616.

Witnesses:

H. Alfred Jaulke

Emil Foster Jr.

Inventor:

Franz Hoch by Knight Bro

Attorneys

UNITED STATES PATENT OFFICE.

FRÂNZ HOCH, OF FRANKFORT-ON-THE-MAIN, GERMANY.

RAIL-JOINT.

13,616. Specification of Reissued Letters Patent. Reissued Sept. 16, 1913.

Original No. 1,018,494, dated February 27, 1912, Serial No. 566,033. Application for reissue filed May 29, 1913. Serial No. 770,747.

*To all whom it may concern:*

Be it known that I, FRÂNZ HOCH, a citizen of the German Empire, and residing at Frankfort-on-the-Main, Germany, have invented certain new and useful Improvements in Rail-Joints, of which the following is a specification.

My invention relates to rail joints in which a continuous splice-bar clasps the ends of the rails.

The principal cause of the destruction of joint-fittings is the existence of excessive play in the fishing-surface of the joint-fittings customary at the present day. Attempts have constantly been made, with the most various shapes of lateral splice-bars, to do away with this play, but without heretofore finally remedying the defect. With the same end in view, joint-fittings comprising shoes and keys have been variously arranged heretofore because the key is excellently adapted as a joint-fitting for obtaining a tight closure at the faces. But a satisfactory result could not be obtained heretofore with these known means. The reason of the defective behavior of such joints may be found in the arrangement having one key, as will be understood from the following considerations: Owing to the vertical pressure which is applied on the head of the rail from the inside edge to the axis of the rail a moment occurs which turns inward, bends the web in this direction, and turns and twists the section of the rail. It consequently follows that the portions within the section of the rail are subjected to small distortions and consequently the distance between the fishing-surface under the head of the rail and that under the base or flange of the rail changes. In the case of continuous splice-bars which themselves support the head of the rail the fishing-surfaces under the head of the rail are worn more than those under the flange of the rail. The lateral forces which occur cause incomparably greater wear of the fishing-surfaces under the head of the rail than the vertical forces, because the former can be taken up only by the slanting supporting-surfaces under the head of the rail, while the supporting-surfaces under the base of the rail have the same direction as the lateral forces. The supporting-surfaces of the continuous splice-bar under the head of the rail must therefore be materially more worn than those under the flange of the rail. But when the amounts of wear are different, in an arrangement having one key above the base of the rail it is not possible to obtain uniform pressure on the two fishing-surfaces by tightening up the key; only the base of the rail can be securely tightened in its seat.

Now a primary object of my invention is to provide the continuous splice-bar, which is well-known *per se*, with keys in such manner that their wedge-surfaces tighten the union of the splice bar with the rail both at its head and its base. I can attain this end by arranging the keys resting against the head and against the flange of the rail, on the one hand, and providing corresponding guides in the continuous splice-bar, on the other hand, or by tensioning the keys relatively to one another and simultaneously tightening the continuous splice-bar, or by other like constructional forms, in which the head and the base of the rail are clamped by longitudinal wedge-surfaces and the continuous splice-bar is pressed against the bottom of the flange of the rail.

One illustrative embodiment of my invention is represented by way of example in the accompanying drawing, wherein:—

Figure 2:
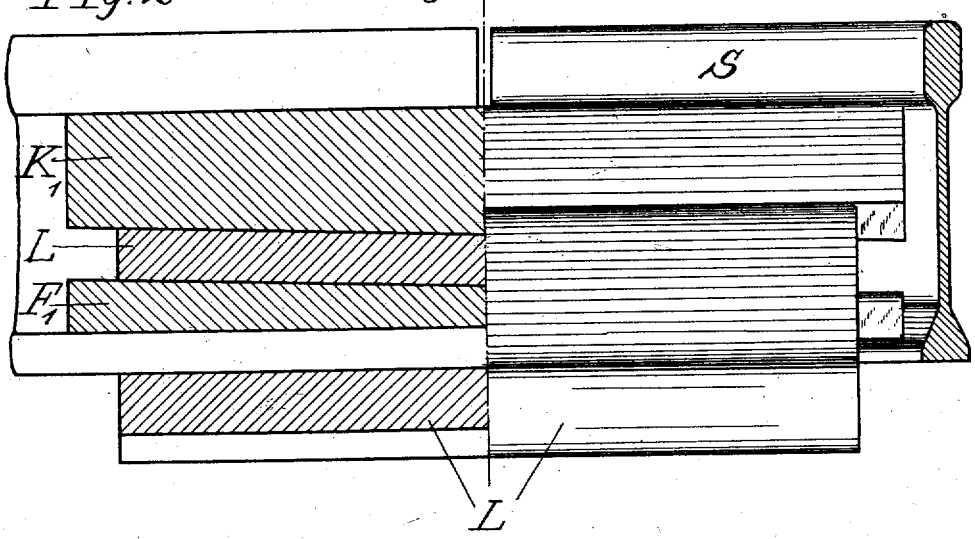

Figure 1 is a vertical transverse section, and Fig. 2 a side elevation, partly in section on the bent line *a—b*.

Referring to the drawing, the joint-fittings comprise the continuous splice-bar L and the keys or wedges $K_1$, $K_2$, $F_1$ and $F_2$. The splice-bar clasps the base of the rail S in well-known manner, whereby the same is supported. The keys $F_1$ and $F_2$ guided in the splice-bar are provided above the base of the rail. In addition to these keys I arrange guides for the keys $K_1$ and $K_2$ on the top of the splice-bar.

The keys can be driven, fully utilizing the wedging action, so that such a close fit is obtained at the head and at the base of the rail that an actually clamped connection is made, in which the play in the fishing-surfaces loses its injurious effect. Simultaneously, however, the base of the rail is securely supported.

These joint-fittings may be thought of as two lateral splice-bars connected under the base of the rail, in which wedges are arranged between the splice-bars and the head and base of the rail. But these lateral splice-bars carry the rail not only at the head, but support it under the base in addition.

The base of the rail may be supported in the well-known ways, either directly by its resting with its entire face on the splice-bar, or by means of fillets or ribs which may be provided in the splice-bar for improving the support of the rail, or by means of a key which adjusts the supporting-surfaces and causes the rail to be supported on the splice-bar.

When the continuous splice-bar is formed as a chair the same arrangement can be employed for a firm resting joint.

I claim:—

In a rail joint, the combination, with a rail, of a continuous splice-bar clasping the base thereof, a wedge at each side of the web of the rail driven between the splice-bar and the upper faces of the flange of the rail, and a wedge at each side of the web of the rail driven between the upper faces of the splice-bar and the head of the rail, each wedge being guided in the splice-bar, substantially as shown, for the purpose specified.

In testimony whereof I have signed my name to this specification in the presence of two witnesses.

FRÂNZ HOCH.

Witnesses:
JEAN GRUND,
CARL GRUND.

Copies of this patent may be obtained for five cents each, by addressing the "Commissioner of Patents, Washington, D. C."